United States Patent

Fujio et al.

[11] Patent Number: 5,193,638
[45] Date of Patent: Mar. 16, 1993

[54] REFERENCE POSITION DETECTION METHOD OF VEHICLE REAR WHEEL STEERING APPARATUS

[75] Inventors: Koji Fujio, Kure; Yutaka Tagashira, Hiroshima; Hiroshi Ogawa, Hiroshima; Hirotaka Kanazawa, Hiroshima; Hiroki Yoshioka, Higashihiroshima, all of Japan

[73] Assignee: Mazda Motor Corporation, Hiroshima, Japan

[21] Appl. No.: 717,070

[22] Filed: Jun. 18, 1991

[30] Foreign Application Priority Data

Jun. 18, 1990 [JP] Japan ................................ 2-160830
Jun. 18, 1990 [JP] Japan ................................ 2-160831
Sep. 29, 1990 [JP] Japan ................................ 2-260873

[51] Int. Cl.⁵ .................................................. B62D 15/02
[52] U.S. Cl. ........................................ 180/140; 280/91
[58] Field of Search .................... 180/140; 280/91; 73/118.1; 364/424.05

[56] References Cited

U.S. PATENT DOCUMENTS

| | | | |
|---|---|---|---|
| 4,999,776 | 3/1991 | Soltis et al. | 364/424.05 |
| 5,121,322 | 6/1992 | Shiraishi et al. | 364/424.05 |
| 5,123,496 | 6/1992 | Kashihara et al. | 364/424.05 X |

FOREIGN PATENT DOCUMENTS

0331120 9/1989 European Pat. Off. .
1-273772 11/1989 Japan .

OTHER PUBLICATIONS

Patent Abstract of Japan, vol. 014, No. 042 (M-092) Jan. 25, 1990 & JP-A-1 273 772 (Mazda).
Patent Abstract of Japan, vol. 013, No. 274 (M-841) Jun. 23, 1989 & JP-A-070 269 (Kubota).
Patent Abstract of Japan, vol. 012, 484 (M-776) Dec. 16, 1988 & JP-A-63 203 478 (Mazda).

Primary Examiner—Charles A. Marmor
Assistant Examiner—Jeffrey A. Kuta

[57] ABSTRACT

A reference position detection method of a vehicle rear wheel steering apparatus in the present invention, is provided with steps of setting an input shaft and the yoke assembly at arbitrary angular positions rotating the input shaft by an arbitrary angle to pass a neutral angular position measuring a rotational angle $\theta$ of the input shaft and a moving amount $\delta 1$ of an output rod assembly upon rotation of the input shaft rotating the yoke assembly to pass a neutral angular position so that the output rod assembly is stroke-moved by a moving amount $-\delta 1$ from a stroke position defined by the moving amount $\delta 1$ of the output rod assembly rotating the input shaft by an angle $-\theta$ after rotating the yoke assembly, and measuring a moving amount $\delta 2$ of the output rod assembly; and determining, as a reference position of the yoke assembly, an angular position obtained by rotating the yoke assembly from the rotated state of the input shaft so that the output rod assembly is displaced by $-\delta 2^2/(\delta 1+\delta 2)$.

17 Claims, 14 Drawing Sheets

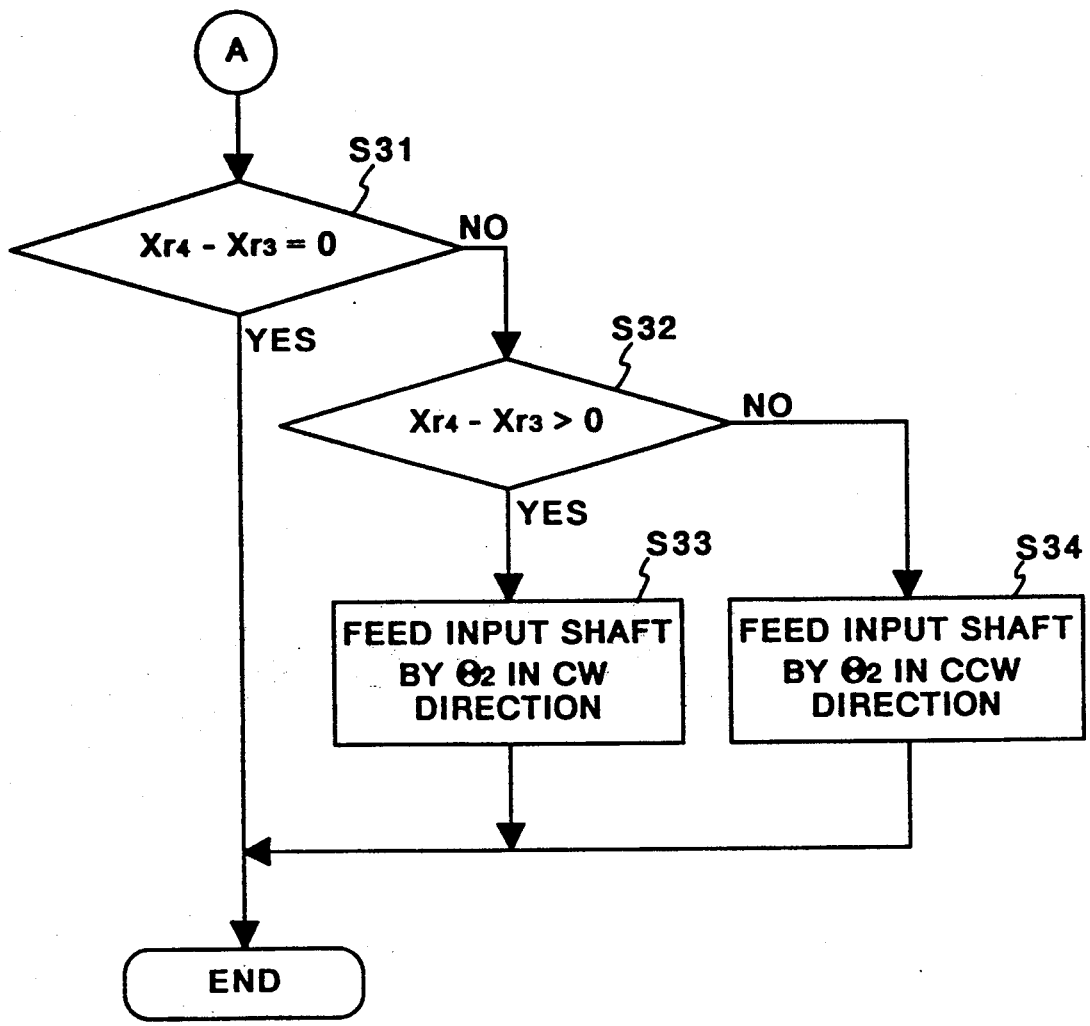
F I G. 14 (B)

REFERENCE POSITION DETECTION METHOD OF VEHICLE REAR WHEEL STEERING APPARATUS

BACKGROUND OF THE INVENTION

The present invention relates to a reference position detection method of a vehicle rear wheel steering apparatus and, more particularly, to a reference position detection method for detecting a neutral position of a mechanical system in a vehicle rear wheel steering apparatus for controlling a rear wheel steering shaft for steering rear wheels by two systems, i.e., a mechanical system and a hydraulic system.

Conventionally, as disclosed in, e.g., Japanese Patent Laid-Open No. 1-273772, a vehicle rear wheel steering apparatus is known. This apparatus comprises an input shaft for inputting a steering angle of front wheels, an output rod member which strokes in the axial direction upon reception of an input from the input shaft so as to steer rear wheels, and a yoke assembly, coupled to and swingably supported by the output rod, for controlling a stroke displacement in accordance with its swing angle.

In this apparatus, the steering control amount of rear wheels is changed in accordance with the stroke displacement of the output rod member on the basis of the swing angle of the yoke assembly. For this reason, in order to precisely steer the rear wheels, a neutral angular position (zero phase) serving as the reference position of the swing movement of the yoke assembly, i.e., a position where the output rod member is not stroke-displaced even when the input shaft is rotated must be precisely determined.

However, in the conventional apparatus, the yoke assembly is swung to a position near the neutral angular position under visual observation, and the true neutral angular position (reference position) where the output rod member is not stroke-displaced even when the input shaft is rotated is detected by trials and errors.

When the neutral angular position of the yoke assembly is detected by trials and errors in this manner, a time required for detecting the true neutral angular position is prolonged due to trying errors, resulting in a troublesome detection operation of the neutral angular position of the yoke assembly.

In the above-described rear wheel steering apparatus, the control steering amount of the rear wheels is determined in accordance with the stroke displacement of the output rod member on the basis of a rotational angle of the input shaft in addition to the yoke assembly. For this reason, in order to precisely steer the rear wheels, the neutral angular position (zero phase) serving as a reference rotational position of the input shaft must also be precisely determined.

In the conventional apparatus, the input shaft is rotated in practice, and a position where the output rod member is not stroke-displaced even when the input shaft is rotated is detected by trials and errors. In this manner, the neutral angular position as the reference position is determined.

When the neutral angular position of the input shaft is detected by trials and errors in this manner, a time required for detecting the neutral angular position is prolonged due to trying errors, resulting in a troublesome detection operation of the neutral angular position (reference position) of the input shaft.

The vehicle rear wheel steering apparatus described in Japanese Patent Laid-Open No. 1-273772 described above comprises the mechanical system for displacing the rear wheel steering shaft for steering the rear wheels, and the hydraulic system for assisting the displacement of the rear wheel steering shaft. The mechanical system comprises the input shaft for inputting the steering angle of the front wheels, the output rod member which strokes in the axial direction upon reception of an input from the input shaft so as to steer the rear wheels, and the yoke assembly, coupled to and swingably supported by the output rod, for controlling a stroke amount of the output rod member upon rotation of the input shaft in accordance with its swing angle. The stroke amount of the output rod member is transmitted to the rear wheel steering shaft by a displacement transmission means coupled to the output rod member. The hydraulic system for assisting the displacement of the rear wheel steering shaft comprises a power steering means for hydraulically assisting the displacement of the rear wheel steering shaft, and a hydraulic pressure control valve for controlling the power steering means. The hydraulic pressure control valve is coupled to the displacement transmission means, so that the mechanical and hydraulic systems are connected to each other.

In the mechanical system of the rear wheel steering apparatus, the stroke amount of the output rod member, i.e., the displacement of the rear wheel steering shaft is determined in accordance with the rotational angle of the input shaft and the swing angle of the yoke assembly. In the hydraulic system, the rear wheel steering shaft is hydraulically assisted so as to be displaced by an amount corresponding to the determined displacement by the power steering means.

Therefore, in order to precisely steer the rear wheels, i.e., to precisely control the rear wheel steering shaft, high-precision neutral adjustment must be performed for both the mechanical and hydraulic systems, and thereafter, these systems must be connected so that the neutral positions (zero phases) of the two systems coincide with each other.

Of the two systems, when the neutral adjustment of the mechanical system, i.e., of the input shaft and the yoke assembly is to be performed, the neutral adjustment of, e.g., the input shaft can be performed as follows. That is, even when the yoke assembly is located at any angular position corresponding to the in-phase side or the opposite phase side, if the input shaft is pivoted over the entire pivoting range, it always passes the neutral angular position. Paying attention to this fact, while the yoke assembly is fixed in a swing angular position corresponding to a specific in-phase position, and in a swing angular position corresponding to a specific opposite phase position, the input shaft is pivoted once over the entire pivoting range for each of these positions. Changes in stroke of the output rod member in accordance with the rotational angle (input angle) of the input shaft in these pivoting operations are expressed as graphs. An intersection between the two graphs is determined as the neutral angular position, thereby detecting the neutral angular position of the input shaft.

However, the mechanical system of the rear wheel steering apparatus includes many meshing portions among gears, and many fitting portions among parts, and a hysteresis occurs in stroke characteristics of the output rod member with respect to the input angle due to cluttering of these portions and, flexure of parts themselves. For this reason, even when the two graphs are obtained, an intersection between these graphs cannot be determined as one point.

With the conventional method described above, although the neutral position can be determined to be within a given range, it is difficult to detect a precise neutral position.

SUMMARY OF THE INVENTION

The present invention has been made in consideration of the above situation, and has as its object to provide a reference position detection method of a vehicle rear wheel steering apparatus, which can easily detect a neutral angular position (zero phase) of a yoke assembly, which position influences control precision of a control steering amount of rear wheels, as a reference position of the vehicle rear wheel steering apparatus.

It is another object of the present invention to provide a reference position detection method of a vehicle rear wheel steering apparatus, which can easily detect a neutral angular position (zero phase) of an input shaft, which position influences control precision of a control steering amount of rear wheels, as a reference position of the vehicle rear wheel steering apparatus.

It is still another object of the present invention to provide a reference position detection method of a vehicle rear wheel steering apparatus, which can eliminate errors caused by the influence of, e.g., a hysteresis, and can perform high-precision neutral adjustment.

In order to achieve the above objects, according to the first aspect of the present invention, a reference position detection method of a vehicle rear wheel steering apparatus comprises:

the first step of setting the input shaft and the yoke assembly at arbitrary angular positions;

the second step of rotating the input shaft by an arbitrary angle to pass a neutral angular position in a state set in the first step;

the third step of measuring a rotational angle $\theta$ of the input shaft and a moving amount $\delta 1$ of the output rod assembly upon rotation in the second step;

the fourth step of rotating the yoke assembly to pass a neutral angular position so that the output rod assembly is stroke-moved by a moving amount $-\delta 1$ from a stroke position defined by the moving amount $\delta 1$ of the output rod assembly measured in the third step;

the fifth step of rotating the input shaft by an angle $-\theta$ after the fourth step, and measuring a moving amount $\delta 2$ of the output rod assembly; and the sixth step of determining, as a reference position of the yoke assembly, an angular position obtained by rotating the yoke assembly from the rotated state in the fifth step so that the output rod assembly is displaced by:

$$-\delta 2^2/(\delta 1+\delta 2)$$

In this manner, according to the first aspect of the reference position detection method, the input shaft and the yoke assembly are set at arbitrary angular positions. In this state, the input shaft is rotated through an arbitrary angle to pass a neutral position, and a rotational angle $\theta$ of the input shaft, and a moving amount $\delta 1$ of the output rod member are measured. The yoke assembly is rotated to pass a neutral angular position, so that the output rod member strokes by a moving amount $-\delta 1$ from the stroke position, defined by the moving amount $\delta 1$, of the output rod member. The input shaft is then rotated through an angle $-\theta$, and a moving amount $\delta 2$ of the output rod member is measured. The yoke assembly is rotated so that the output rod member is displaced by:

$$-\delta 2^2/(\delta 1+\delta 2)$$

This angular position of the yoke assembly is detected as the neutral angular position of the yoke assembly. Therefore, the neutral position (zero phase) as the reference position of the yoke assembly can be precisely and easily detected without performing trials and errors.

According to the second aspect of the present invention, a reference position detection method of a vehicle rear wheel steering apparatus, comprises:

the first step of setting the yoke assembly at a swing angular position as a reference position;

the second step of detecting a stroke displacement of the output rod assembly while rotating the input shaft in a state set in the first step;

the third step of calculating a rate of change in stroke displacement of the output rod assembly with respect to a rotational angle of the input shaft; and the fourth step of determining, as a reference position of the input shaft, an angular position where the rate of change calculated in the third step becomes a maximum value.

According to the third aspect of the present invention, a reference position detection method of a vehicle rear wheel steering apparatus, comprises:

the first step of setting the yoke assembly at a first swing angular position;

the second step of detecting a first stroke displacement of the output rod assembly while rotating the input shaft;

the third step of setting the yoke assembly at a second swing angular position different from the first swing angular position;

the fourth step of detecting a second stroke displacement of the output rod assembly while rotating the input shaft; and the fifth step of determining, as a reference position of the input shaft, a position where the displacements of the output rod assembly with respect to a rotational angle of the input shaft at the first and second swing angular positions of the yoke assembly coincide with each other.

In this manner, according to the second or third aspect of the reference position detection method, the neutral angular position of the input shaft can be precisely detected.

In particular, according to the second aspect, the neutral angular position of the input shaft can be detected with reference to a specific phase position (e.g., a maximum phase position). According to the third aspect, since the neutral angular position can be detected with reference to two phases, an offset of the neutral angular position between different phases can be reduced.

According to the fourth aspect of the present invention, a reference position detection method of a vehicle rear wheel steering apparatus, comprises:

the first step of detecting a temporary reference position of one of the input shaft and the yoke assembly;

the second step of fixing the one of the input shaft and the yoke assembly at the detected temporary reference position;

the third step of driving the other one of the input shaft and the yoke assembly;

the fourth step of detecting a displacement state of the output rod assembly in a driving state in the third step; and the fifth step of detecting a reference position of the one of the input shaft and the yoke assembly on the basis of a detection result in the fourth step.

In this manner, according to the fourth aspect of the reference position detection method, a temporary neutral position of one of the input shaft and the yoke assembly is detected, the one component is fixed at the temporary neutral position, and the other component is driven in this state. If the one component is fixed at a true neutral position, the displacement of the output rod member is minimized (0) when the other component is driven. Therefore, an offset of the temporary neutral position from the true neutral position can be calculated and corrected on the basis of the displacement state (displacement direction and amount) of the output rod member. As a result, an error due to the influence of the hysteresis can be eliminated, and high-precision neutral adjustment can be performed.

When the temporary neutral position is detected, the temporary neutral position of the input shaft is detected on the basis of stroke characteristics of the output rod member with respect to the rotational angle of the input shaft, and the temporary neutral position of the yoke assembly is detected on the basis of stroke characteristics of the output rod member with respect to the swing angle of the yoke assembly. Therefore, a temporary neutral position closer to the true neutral position can be detected. As a result, a correction amount can be decreased, and more precise neutral adjustment can be performed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Various embodiments of a reference position detection method according to the present invention will be described in detail below with reference to the accompanying drawings. In this case, the method of the present invention is applied to a vehicle rear wheel steering apparatus.

The structure of a vehicle rear wheel steering apparatus to which the reference position detection method of the present invention is applied will be explained below with reference to FIGS. 1 to 6.

Figure 1:
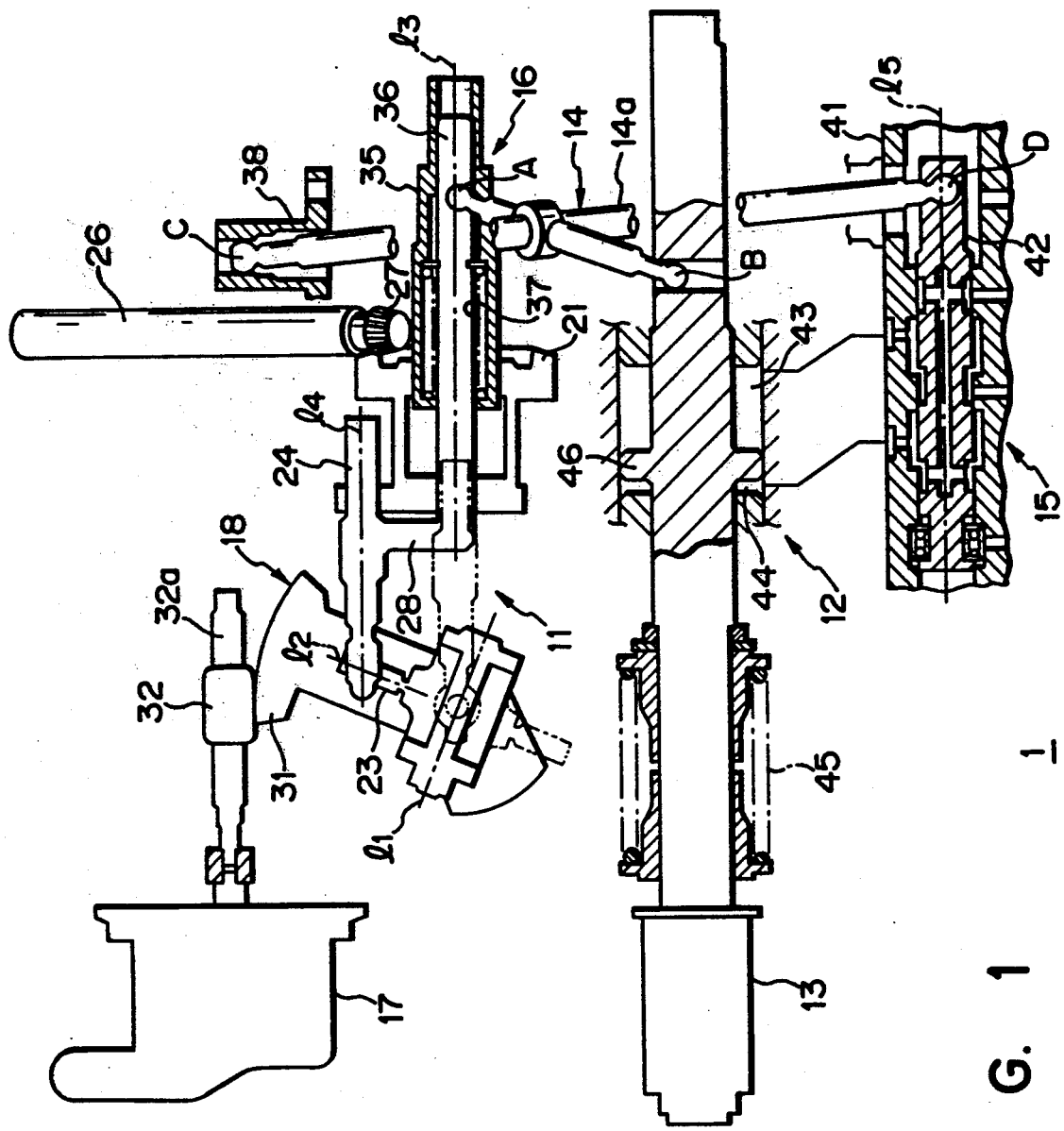
FIG. 1 is a schematic view showing a structure of a vehicle rear wheel steering apparatus to which a reference position detection method according to the present invention is applied.
Figure 2:
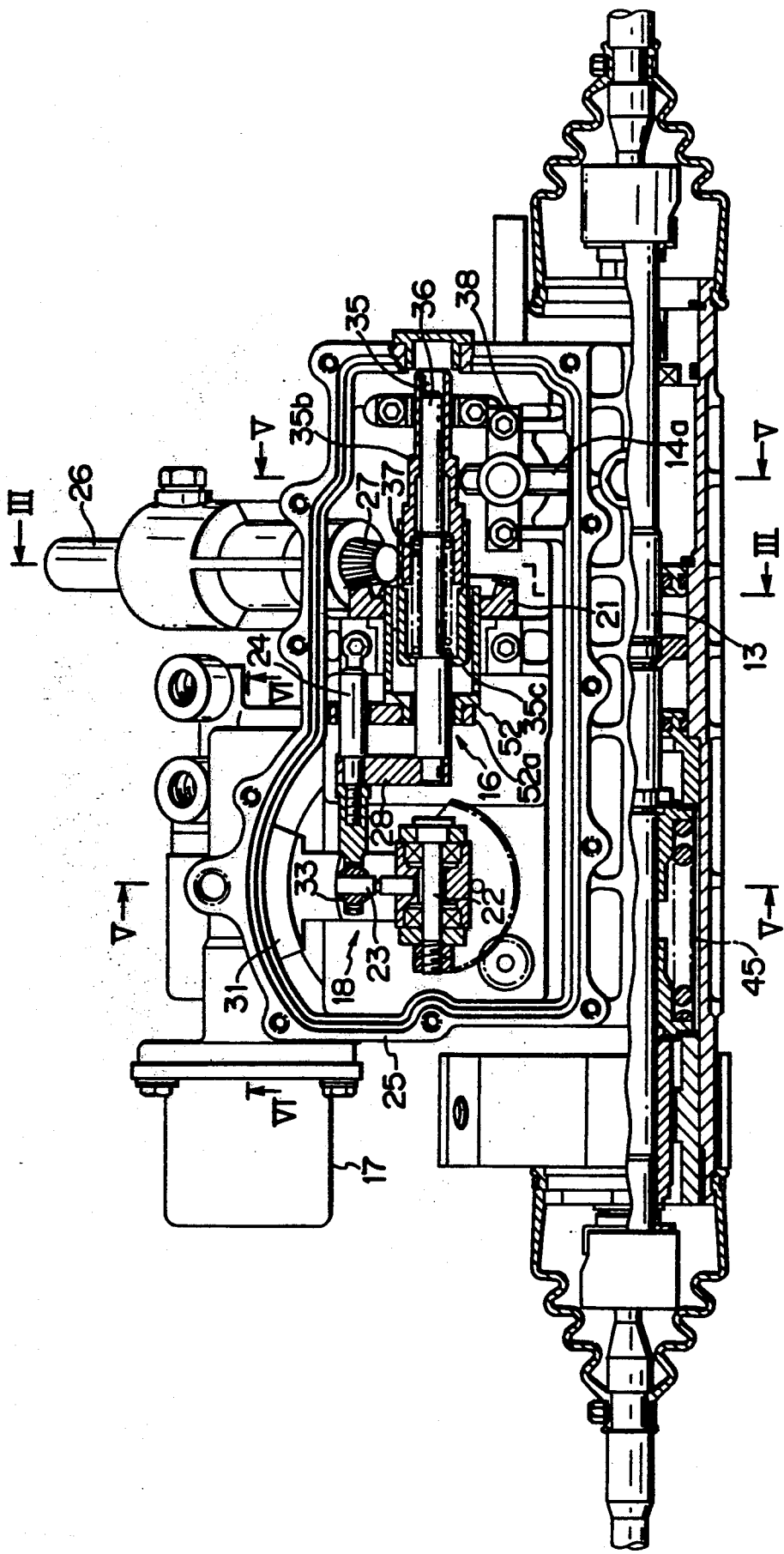
FIG. 2 is a sectional view showing a structure of a steering ratio varying mechanism arranged in the rear wheel steering apparatus shown in FIG. 1.
Figure 3:
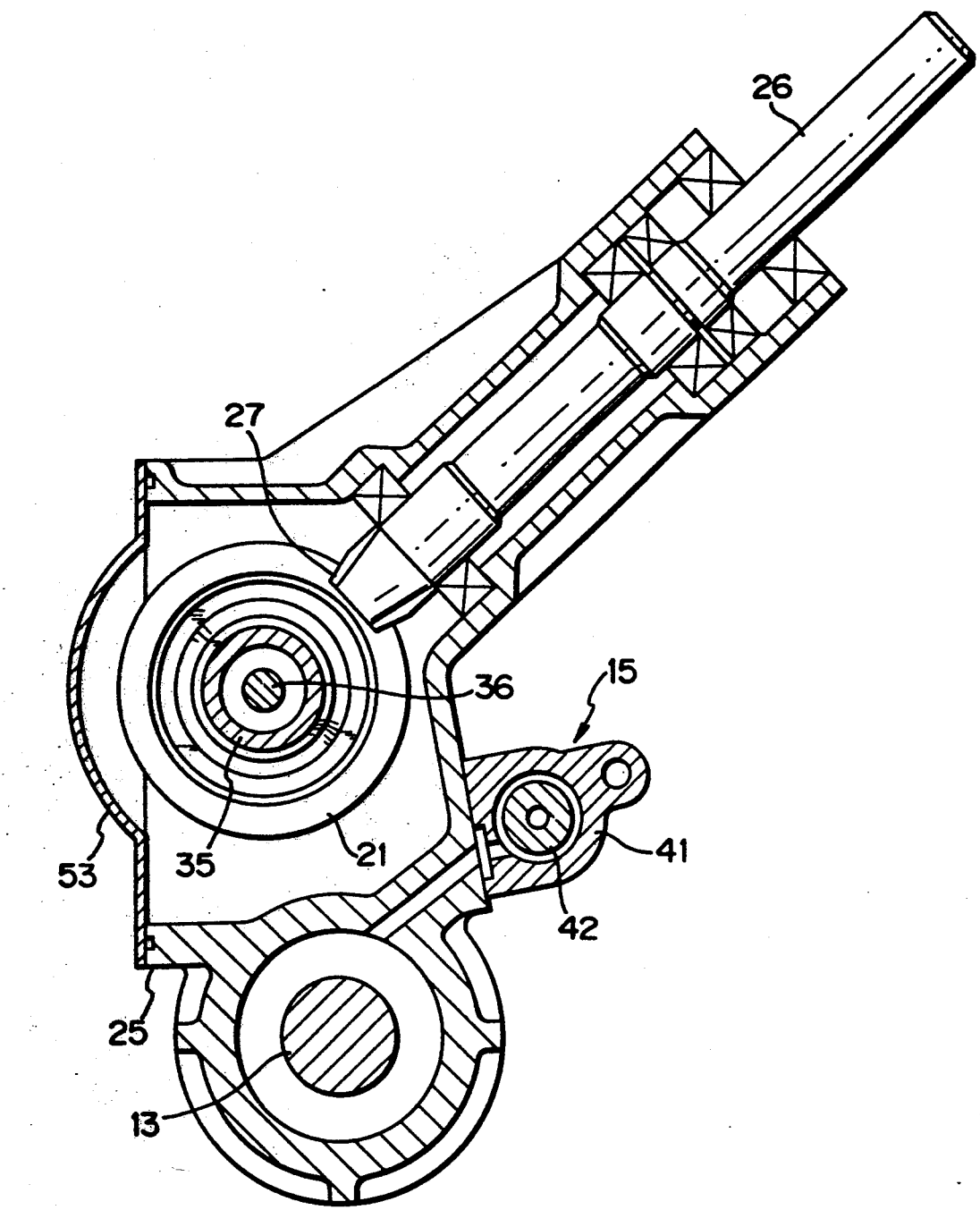
FIG. 3 is a sectional view of the steering ratio varying mechanism shown in FIG. 2 taken along a line III—III in FIG. 2.
Figure 4:
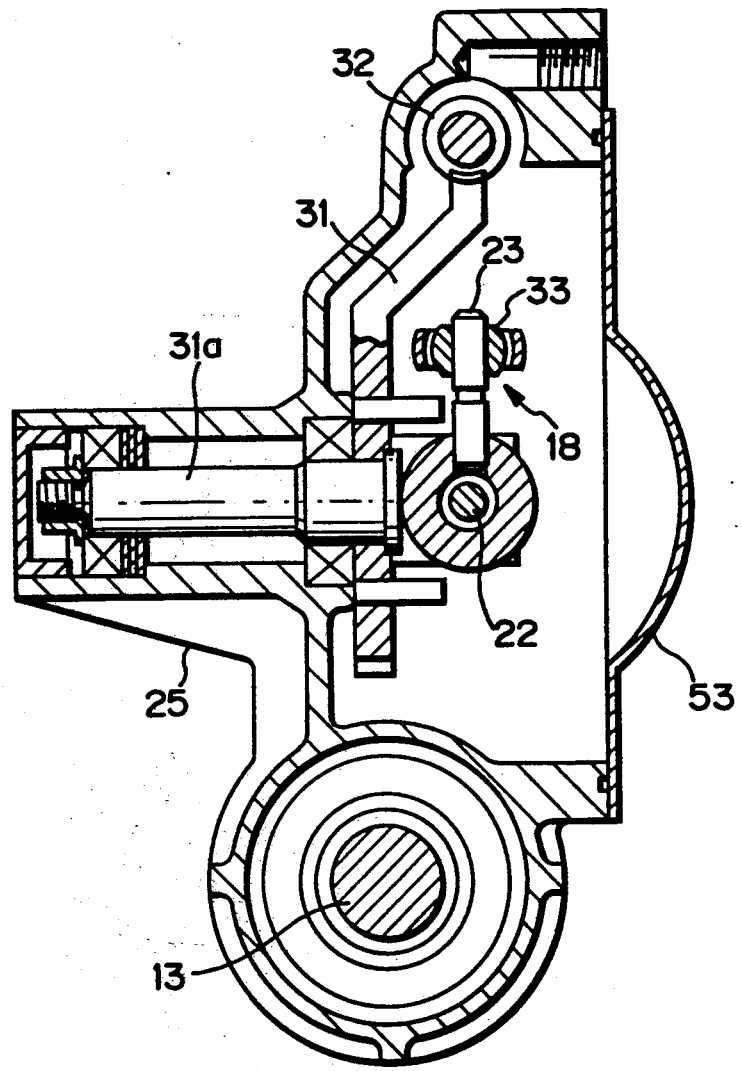
FIG. 4 is a sectional view of the steering ratio varying mechanism shown in FIG. 2 taken along a line IV—IV in FIG. 2.
Figure 5:
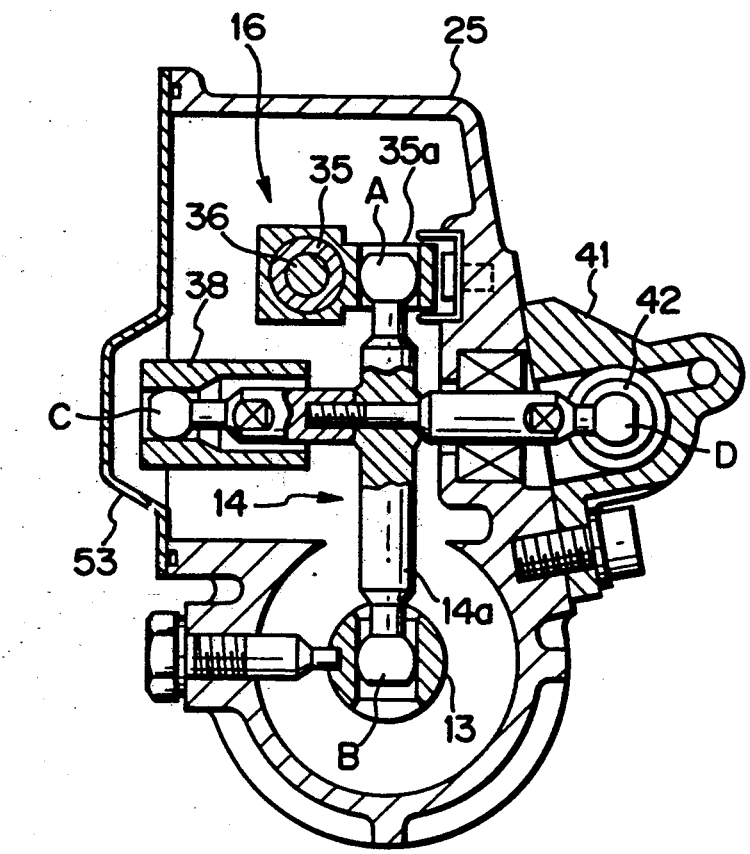
FIG. 5 is a sectional view of the steering ratio varying mechanism shown in FIG. 2 taken along a line V—V in FIG. 2.

A vehicle rear wheel steering apparatus 1 comprises a steering ratio varying mechanism 11, a power steering mechanism 12, a rear wheel steering shaft 13, a displacement transmission mechanism 14, and a hydraulic control valve 15, as shown in the schematic view of FIG. 1. The rear wheel steering apparatus 1 steers rear wheels (not shown) in accordance with predetermined steering ratio characteristics, i.e., a steering amount of front wheels, and changes the steering ratio in accordance with a vehicle velocity.

The rear wheel steering shaft 13 extends in the widthwise direction of a vehicle body, and two end portions thereof are coupled to a pair of right and left rear wheels via pairs of right and left tie rods and knuckle arms. The rear wheels are steered by the widthwise stroke displacement of the rear wheel steering shaft 13.

The widthwise stroke displacement of the rear wheel steering shaft 13 is attained by the steering ratio varying mechanism 11, and the power steering mechanism 12.

The steering ratio varying mechanism 11 is arranged to change a steering ratio when the rear wheels are steered. The steering ratio varying mechanism 11 has an output rod assembly 16 which is stroke-displaced along the axial direction (i.e., the widthwise direction) in accordance with a steering angle of front wheels (or of a steering wheel).

The ratio of the stroke displacement of the output rod assembly 16 to the steering angle of the front wheels (corresponding to the steering ratio) is changed in accordance with the swing angle of a yoke assembly 18 which is swung by a stepping motor 17, as will be described later. The rotational amount of the stepping motor 17 is appropriately controlled on the basis of a vehicle velocity signal output from a vehicle velocity sensor (not shown). Note that the actual rotational amount of the stepping motor 17 is detected by a steering ratio sensor (not shown), and is feedback-controlled by a detection signal from the sensor.

The hydraulic control valve 15 is controlled in accordance with the stroke displacement of the output rod assembly 16 of the steering ratio varying mechanism 11. The hydraulic control valve 15 controls the power steering mechanism 12 for generating a steering force by utilizing a hydraulic pressure. The power steering mechanism 12 assists the displacement of the rear wheel steering shaft 13.

The steering ratio varying mechanism 11 comprises the output rod assembly 16, the stepping motor 17, the yoke assembly 18 (a swing shaft member 22, a pendulum arm 23, and a swing gear 31), a bevel gear 21, and a coupling rod 24. These members 16, 17, 18, 21, and 24 are stored in a casing 25, as shown in detail in FIGS. 2 to 7.

The output rod assembly 16 of the steering ratio varying mechanism 11 is supported by the casing 25 to be able to be stroke-displaced in its axial direction. When the output rod assembly 16 is stroke-displaced in the axial direction, as will be described later, it displaces the rear wheel steering shaft 13 in its axial direction (widthwise direction) via the displacement transmission mechanism 14, thereby steering the rear wheels coupled to the two end portions of the rear wheel steering shaft 13.

The bevel gear 21 is supported by the output rod assembly 16 via a cylindrical support member 52 to be rotatable about an axis coaxial with the output rod assembly 16 together with the output rod assembly 16 while being located on the output rod assembly 16 side of a lever 28 of the output rod assembly 16. A pinion 27 is attached to the rear end portion of an input shaft 26 for receiving a steering angle of the front wheels, and is meshed with the bevel gear 21. When the pinion 27 is rotated upon steering of the steering wheel, the bevel gear 21 is rotated about the axis.

Figure 6:
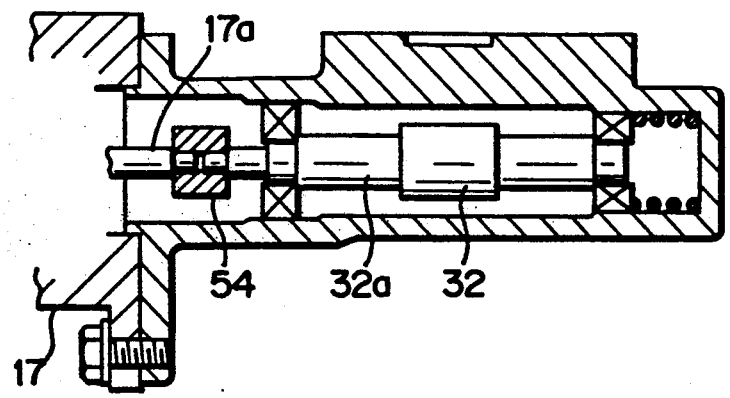
FIG. 6 is a sectional view of the steering ratio varying mechanism shown in FIG. 2 taken along a line VI—VI in FIG. 2.

The swing shaft member 22 has an axis which can be located at a position where it is coaxial with the output rod assembly 16, and is fixed to the swing gear 31. The swing gear 31 is meshed with a worm 32 which is rotated upon the driving operation of the stepping motor 17, and is pivoted about a swing shaft 31a (FIG. 4) which is perpendicular to a drawing surface crossing the axis of the swing shaft member 22. Upon pivotal movement of the swing gear 31, the swing shaft member 22 is simultaneously pivoted. A shaft (to be defined as a yoke shaft hereinafter) 32a of the worm 32 is coupled to a motor shaft 17a of the stepping motor 17 via a coupling member 54 (FIG. 6).

The pendulum arm 23 is coupled to the swing shaft member 22 to be swingable about an axis 11 of the swing shaft member 22. The coupling position of the pendulum arm 23 to the swing shaft member 22 is determined so that an axis 12 of the pendulum arm 23 passes an intersection between the pivot axis and the axis 11 of the swing shaft member 22.

The coupling rod 24 has an axis parallel to an axis 13 of the output rod assembly 16 like in the rear wheel steering shaft 13. The coupling rod 24 is coupled to the output rod assembly 16, the bevel gear 21, and the pendulum arm 23, and couples the output rod assembly 16 and the yoke assembly 18 to each other. More specifically, the coupling rod 24 is coupled to the output rod assembly 16 by divisionally coupling the intermediate portion of the coupling rod 24 to the lever 28 fixed to the end portion of the output rod assembly 16. The coupling rod 24 is coupled to the bevel gear 21 by inserting one end portion of the coupling rod 24 in an insertion hole formed in an extending portion 52a of the support member 52 to which the bevel gear 21 is attached. The coupling rod 24 is coupled to the pendulum arm 23 by inserting the pendulum arm 23 in an insertion hole of a ball joint member 33 which is arranged on the other end portion of the coupling rod 24 to be rotatable in all the directions.

Therefore, although the coupling rod 24 is fixed to the output rod assembly 16, it is slidable along the bevel gear 21 in a direction of an axis 14, and is slidable along the pendulum arm 23 in a direction of the axis 12.

The axis 12 of the pendulum arm 23 is inclined with respect to a direction perpendicular to the axis 13 upon pivotal movement of the swing shaft member 22, and the pendulum arm 23 slides in the inclined direction. In this case, a change in included angle between axes 12 and 14 is absorbed. As a result, of a force transmitted from the pendulum arm 23 to the coupling rod 24, a component in a direction perpendicular to the axis 13 of the output rod assembly 16 is absorbed by the above-described coupling point, thus allowing relative movement in the direction perpendicular to the axis 13.

In this manner, the pendulum arm 23 (i.e., the yoke assembly 18) and the coupling rod 24 in the steering ratio varying mechanism 11 are coupled to each other, so that they are relatively movable in the direction perpendicular to the axis 13. As a result, when the pendulum arm 23 is pivoted, the coupling point between the pendulum arm 23 and the coupling rod 24 draws a circular or elliptic path on the outer circumferential surface of a cylinder having the axis 13 as the center, and a predetermined radius.

As described above, the pendulum arm 23 and the coupling rod 24 are coupled to each other, so that they can be relatively movable in the direction perpendicular to the axis 13 of the output rod assembly 16. In this manner, an angle formed by the axis 14 of the coupling rod 24 and the axis 13 of the output rod assembly 16 can be kept constant, and the displacement of the output rod assembly 16 can be prevented from being deviated to the right or left.

The output rod assembly 16 comprises an output rod 36, one end portion of which is coupled to the coupling rod 24 via the lever 28, and a cylindrical rod guide 35 in which the other end portion of the output rod 36 is fitted to be displaceable in the direction of the axis 13. The end portions of the rod guide 35 and the output rod 36 are supported by the casing 25. The rod guide 35 comprises a first cylindrical member 35b having an engaging portion 35a (FIG. 5) to be engaged with an engaging end portion A of the displacement transmission mechanism 14, and a second cylindrical member 35c threadably engaged with the first cylindrical member 35b. A spring 37 is interposed between the second cylindrical member 35c and the output rod 36.

Therefore, when a displacement in the direction of the axis 13 is transmitted to the output rod 36 by the coupling rod 24, the displacement is normally transmitted from the output rod 36 to the rod guide 35 via the spring 37, and thereafter, is transmitted from the rod guide 35 to the engaging end portion A of the displacement transmission mechanism 14 engaged with the engaging portion 35a. However, when the movement of the engaging end portion A of the displacement transmission mechanism 14 is regulated, and a load exceeding a biasing force of the spring 37 acts on the rod guide 35 upon displacement of the output rod 36, the displacement of the output rod 36 is absorbed by the contraction of the spring 37, and is not transmitted to the rod guide 35, and hence, to the displacement transmission mechanism 14.

The hydraulic control valve 15 comprises a valve housing 41, and a valve spool 42 which is housed in the valve housing 41 to be displaceable in a direction of an axis 15 parallel to the axis 13 of the output rod assembly 16. The valve spool 42 is displaced by the output rod assembly 16 and the rear wheel steering shaft 13 via the displacement transmission mechanism 14 (to be described in detail below). Upon displacement of the valve spool 42, supply of a hydraulic pressure to the power steering mechanism 12 is controlled.

A center ring spring 45 is fitted on the rear wheel steering shaft 13. When a hydraulic pressure is lost in the hydraulic control valve 15 or the power steering mechanism 12, or when a hydraulic pressure in a cylinder of the power steering mechanism 12 is lost by drain-opening the hydraulic system since the mechanical system of the rear wheel steering apparatus 1 is damaged or fails, it is impossible to hold a neutral position by the hydraulic pressure. When the hydraulic pressure is lost, the rear wheel steering shaft 13 is positioned at the neutral position, i.e., a position where the rear wheels are not steered and in a straight travel state (a so-called 2WS state) by the biasing force of the center ring spring 45, thus attaining so-called fail-safe.

The cylinder of the power steering mechanism 12 is arranged to displace the rear wheel steering shaft 13 in the widthwise direction by the hydraulic pressure. A piston 46 of this cylinder is directly coupled to the rear wheel steering shaft 13. Right and left oil chambers 43 and 44 are respectively formed on the right and left side of the piston 46.

The displacement transmission mechanism 14 is engaged with the valve spool 42, the rear wheel steering shaft 13, and a vehicle body (i.e., a support 38) in addition to the output rod assembly 16 (in particular, the engaging portion 35a of the rod guide 35). In this manner, upon displacement of the output rod assembly 16, the valve spool 42 can be displaced in a predetermined direction. Upon displacement of the rear wheel steering shaft 13 caused by the displacement of the valve spool 42, a displacement opposite to that of the valve spool 42 can be attained.

More specifically, the displacement transmission mechanism 14 comprises a cross-shaped lever 14a consisting of vertical and horizontal levers. The engaging end portion A as one end portion of the vertical lever is engaged with the engaging portion 35a of the rod guide 35, and an engaging end portion B as the other end portion thereof is engaged with the rear wheel steering shaft 13. An engaging end portion C as one end portion of the horizontal lever is engaged with the support 38 mounted and fixed on the vehicle body, and an engaging end portion D as the other end portion thereof is engaged with the valve spool 42. The engaging end portions A, B, and D are engaged with the engaging portion 35a of the rod guide 35, the rear wheel steering shaft 13, and the valve spool 42 so as not to be movable in the axial direction, and to be movable and rotatable in other directions. On the other hand, the engaging end portion C is engaged to be rotatable but not to be movable in the axial direction by a ball joint (not shown).

Therefore, if the output rod assembly 16 is displaced to the right in a state wherein both the valve spool 42 and the rear wheel steering shaft 13 are at their neutral positions, the engaging end portion A of the cross-shaped lever 14a is displaced to the right together with the output rod assembly 16. When the engaging end portion A is displaced, the rear wheel steering shaft 13 receives a tire counterforce, and a counterforce by the center ring spring 45. For this reason, the engaging end portion B is immovable in the axial direction. Since the engaging end portion C is mounted and fixed on the support 38 (vehicle body), and is immovable, the cross-shaped lever 14a is inclined with respect to a straight line connecting the engaging end portions B and C. More specifically, the cross-shaped lever 14a is operated in a direction to displace the valve spool 42 in the right direction as the predetermined direction. As a result, the valve spool 42 is displaced to the right by the engaging end portion D.

In this manner, when the valve spool 42 is displaced from the neutral position to the right, the hydraulic pressure in the right oil chamber 43 is increased, and the hydraulic pressure in the left oil chamber 44 is decreased. As a result, the power steering mechanism 12 generates a hydraulic pressure for pushing the rear wheel steering shaft 13 to the left. The hydraulic pressure for pushing the rear wheel steering shaft 13 to the left is increased with an increase in right displacement of the valve spool 42, thus setting a balanced position.

When the valve spool 42 is displaced to the right from the neutral position to the balanced position by a predetermined amount, the hydraulic pressure generated by the power steering mechanism 12 accordingly is balanced with external forces (the biasing force of the center ring spring, the tire counterforce, and the like) acting on the rear wheel steering shaft 13.

When the valve spool 42 is further displaced to the right from this state, the hydraulic pressure generated by the power steering mechanism 12 becomes larger than the external forces acting on the rear wheel steering shaft 13. In this manner, the rear wheel steering shaft 13 is displaced to the left by the hydraulic pressure.

When the rear wheel steering shaft 13 is displaced to the left, the engaging end portion B of the cross-shaped lever 14a is displaced to the left together with the rear wheel steering shaft 13. At this time, the output rod assembly 16 receives the steering force of the steering wheel, and a tire counterforce of the front wheels. Since both the engaging end portions A and C are immovable, the cross-shaped lever 14a is inclined with respect to a straight line connecting the engaging end portions A and C, and is returned to the balanced position, thus stopping the displacement of the rear wheel steering shaft 13.

When the output rod assembly 16 is further displaced to the right from this state, and the valve spool 42 is displaced to the right, the rear wheel steering shaft 13 is displaced to the left in the same manner as described above. The displacement of the shaft 13 is stopped when the valve spool 42 is returned to the balanced position. Upon repetition of this operation, the rear wheel steering shaft 13 is displaced by an amount corresponding to the displacement of the output rod assembly 16, and the rear wheels are steered in accordance with the displacement.

When the output rod assembly 16 is displaced to the left, the moving directions of the cross-shaped lever 14a, the valve spool 42, and the rear wheel steering shaft 13 are opposite to those described above, and the operation principle is the same. Thus, a detailed description thereof will be omitted. Note that the movement of the valve spool 42 is basically the same as that in the prior art (Japanese Patent Laid-Open No. 1-273772) described above.

Steering ratio change control by the steering ratio varying mechanism 11 can be performed based on various factors, and various change control patterns are also available. In this embodiment, the control is made based on a detected vehicle velocity. That is, in a low-velocity region, the rear wheels re turned in a phase opposite to those of the steering wheel and the front wheels, thus assuring an easy turn, and in a high-velocity region, the rear wheels are turned in phase with those of the steering wheel and the front wheels, thus improving traveling safety. In this case, the phases of the steering wheel and the front wheels are always in phase with each other.

In the rear wheel steering apparatus 1 with the above-mentioned structure, the precision of a control steering amount of the rear wheels largely depends on the positioning precision to the neutral position as the reference position.

The first embodiment of a detection method of a reference position (i.e., a neutral position) as the characteristic feature of the present invention will be described below. In the first embodiment, a neutral position detection method of the yoke assembly 18 (more specifically, the swing gear 31) will be described in detail below with reference to FIGS. 7 to 9. The neutral position detection method is executed in a state wherein the support 38 is temporarily fixed, a cover 53 is not attached to the casing 25, and no hydraulic pressure is applied.

Figure 7:
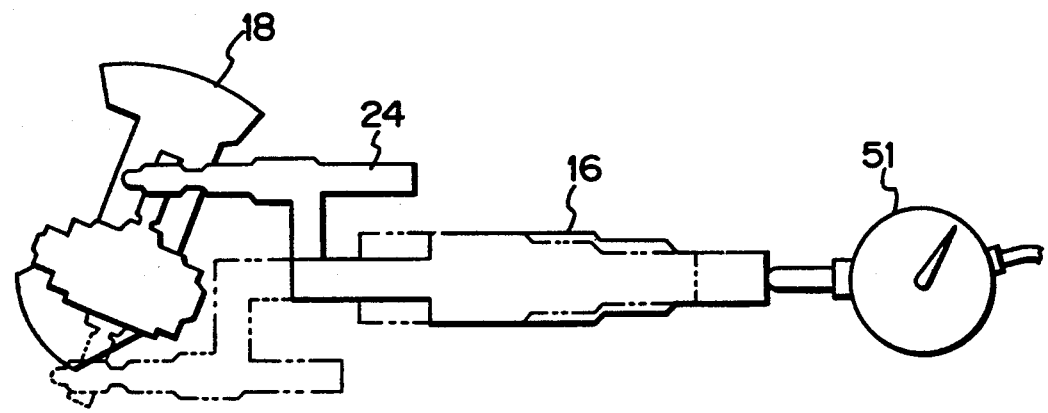
FIGS. 7 and 8 are views for explaining a detection method of a neutral angular position of a yoke assembly as the first embodiment of the reference position detection method according to the present invention.

As shown in FIG. 7, the input shaft 26 is fixed at an arbitrary angular position other than a neutral angular position, and the yoke assembly 18 is fixed at an arbitrary angular position other than a neutral angular position. A displacement gauge 51 is attached to the end portion of the output rod assembly 16. The displacement gauge 51 can detect an axial moving amount of the output rod assembly 16.

Figure 8:
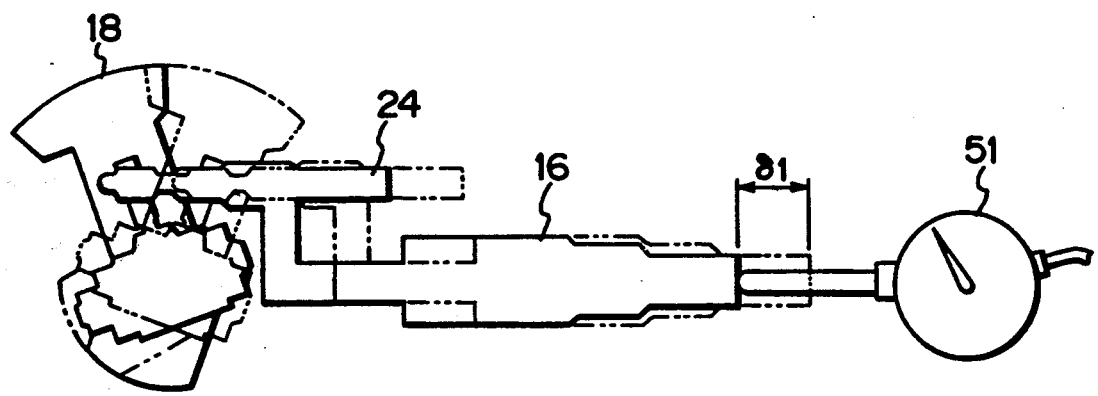

As shown in FIG. 8, the input shaft 26 is rotated through an arbitrary angle to have the neutral angular position as a boundary. The rotational angle ($\theta$) of the input shaft 26, and the moving amount ($\delta_1$) of the output rod assembly 16 at that time are measured, and stored.

Thereafter, the yoke assembly 18 is rotated to have the neutral angular position as a boundary, so that the output rod assembly 16 is stroke-displaced by the moving amount ($-\delta_1$). The input shaft 26 is rotated through the rotational angle ($-\theta$), and a moving amount $\delta_2$ of the output rod assembly at this time is stored.

The yoke assembly 18 is rotated, so that the output rod assembly 16 is stroke-displaced by $-\delta_2^2/(\delta_1+\delta_2)$. The angular position of the yoke assembly 18 obtained by this rotation is the true neutral angular position (zero phase).

The reason why the true neutral angular position (zero phase) of the yoke assembly 18 is obtained by the stroke displacement $-\delta_2^2/(\delta_1+\delta_2)$ is as follows.

Figure 9:
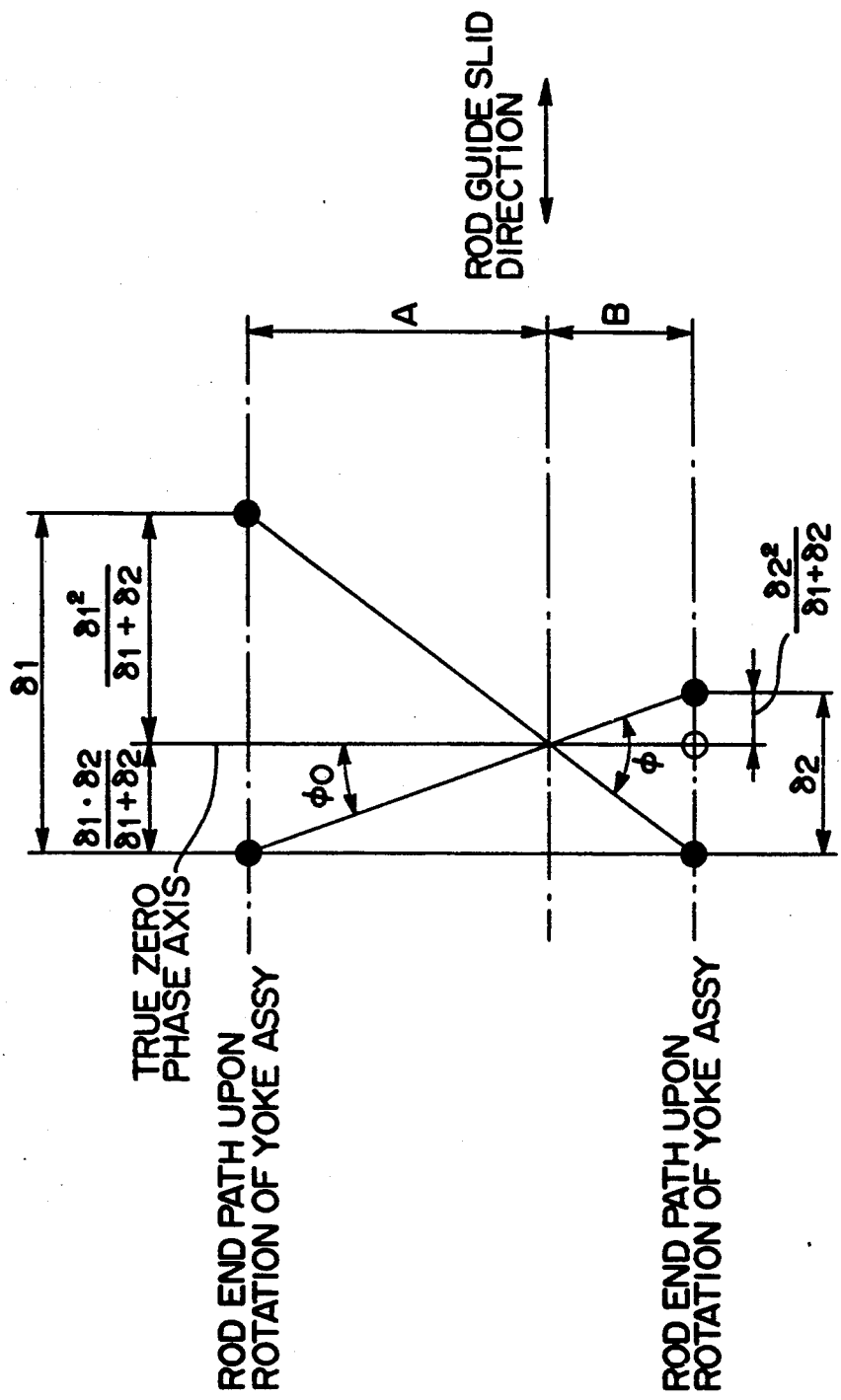
FIG. 9 is a view for explaining the detection principle of the neutral angular position of the yoke assembly in the first embodiment.

As shown in FIG. 9, stroke displacements of the output rod assembly 16 (rod guide 35) at two yoke angles $\phi$ and $\phi_0$ can be respectively expressed as follows:

$$\delta_1 = A\{\tan\phi_0 + \tan(\phi-\phi_0)\} \qquad (1)$$

$$\delta_2 = B\{\tan\phi_0 + \tan(\phi-\phi_0)\} \qquad (2)$$

From equations (1) and (2), we have:

$$\delta_1/\delta_2 = A/B \qquad (3)$$

$\delta_2$ can also be expressed as follows:

$$\delta_2 = A\tan\phi_0 B\tan\phi_0 \cdot \tan\phi_0 = \delta_2/(A+B) \qquad (4)$$

When two sides of equation (4) are multiplied with B, we have:

$$\begin{aligned} B\tan\phi_0 &= \delta_2 \cdot B/(A+B) \\ &= \delta_2/(A/B+1) \end{aligned} \qquad (5)$$

When equation (3) is substituted in equation (5), we have:

$$\begin{aligned} B\tan\phi_0 &= \delta_2/(\delta_1/\delta_2+1) \\ &= \delta_2^2/(\delta_1+\delta_2) \end{aligned}$$

As a result, the neutral position of the yoke assembly 18 can be detected.

In this manner, after the neutral angular position of the yoke assembly 18 is detected, the support 38 is temporarily assembled to be able to be displaced. Then, the neutral position of the rear wheel steering shaft 13, where the rear wheel steering shaft 13 is not displaced even when the support 38 is displaced upon application of a hydraulic pressure, is detected. The support 38 is actually assembled while the rear wheel steering shaft 13 is held at the detected neutral position. In this manner, an offset between the neutral positions of the mechanical and hydraulic systems can be absorbed by adjusting the assembling position of the support 38, thereby attaining the neutral adjustment of the rear wheel steering apparatus 1.

As described in detail above, in the neutral position detection method in the first embodiment, the input shaft 26 and the yoke assembly 18 are set at arbitrary angular positions. In this state, the input shaft 26 is rotated through an arbitrary angle to pass the neutral position, and the rotational angle $\theta$ of the input shaft 26 and the moving amount $\delta_1$ of the output rod assembly 16 are measured. The yoke assembly 18 is rotated to pass the neutral angular position, so that the output rod assembly 16 is stroke-displaced by a moving amount $-\delta_1$ from the stroke position defined by the moving amount $\delta_1$ of the output rod assembly 16. Thereafter, the input shaft 26 is rotated through a rotational angle $-\theta$, and a moving amount $\delta_2$ of the output rod assembly 16 is measured. The yoke assembly is then rotated so that the output rod assembly 16 is displaced by:

$$-\delta_2^2/(\delta_1-\delta_2)$$

This angular position of the yoke assembly is detected as the neutral angular position of the yoke assembly. As a result, the neutral angular position (zero phase) as the reference position of the yoke assembly 18 can be precisely and easily detected without trials and errors.

The present invention is not limited to the arrangement of the first embodiment described above, and various changes and modifications may be made within the spirit and scope of the invention. Other embodiments of the present invention will be described hereinafter. In the following description, the same reference numerals denote the same parts as in the first embodiment, and a detailed description thereof will be omitted.

For example, in the first embodiment described above, the detection method of the neutral position of the yoke assembly 18 (more specifically, the swing gear 31) has been described. However, the present invention is not limited to this method, but may be practice as in the second embodiment shown in FIGS. 10 to 12.

Figure 12:
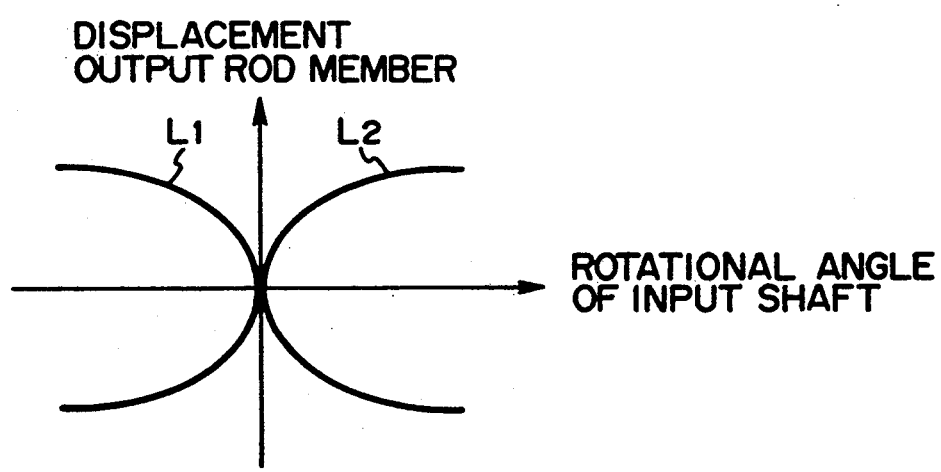
FIG. 12 is a view for explaining the detection principle of the neutral position detection method of an input shaft in the third embodiment of the present invention.

The second embodiment of a reference position detection method according to the present invention will be described in detail below with reference to FIGS. 10 to 12. In the second embodiment, a method of detecting, as a reference position, a neutral position of the input shaft 26, which position largely influences the precision of a control steering amount of the rear wheels, will be described below.

The neutral position detection method of the input shaft 26 in the second embodiment is executed in a state wherein the support 38 is temporarily assembled, no cover 53 is attached to the casing 25, and no hydraulic pressure is applied like in the first embodiment described above.

Figure 10:
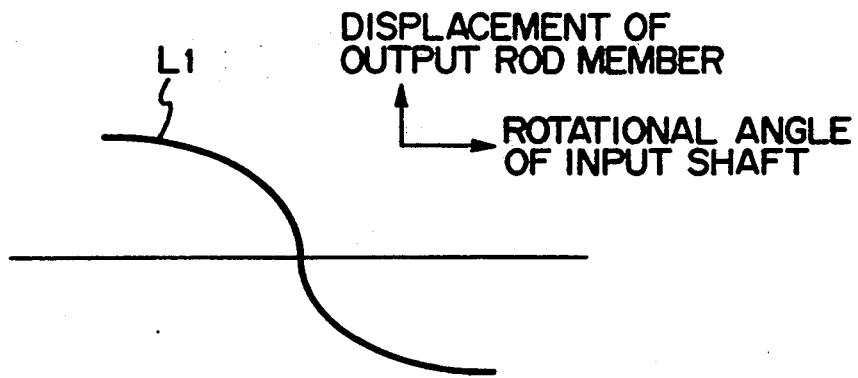
FIG. 10 is a view for explaining the detection principle of a neutral position detection method of an input shaft as the second embodiment of the reference position detection method according to the present invention.

Upon practice of the second embodiment, a graph showing the relationship between the stroke displacement of the output rod assembly 16 and the rotational angle of the input shaft 26 can be expressed as a sine curve, as shown in FIG. 10. As can be seen from FIG. 10, the neutral position of the input shaft 26 is a position (steepest slope point) where a rate of change (an inclination of the sine curve $L_1$ in FIG. 10) in stroke displacement of the output rod assembly 16 with respect to the rotational angle of the input shaft 26 becomes maximum.

Figure 11:
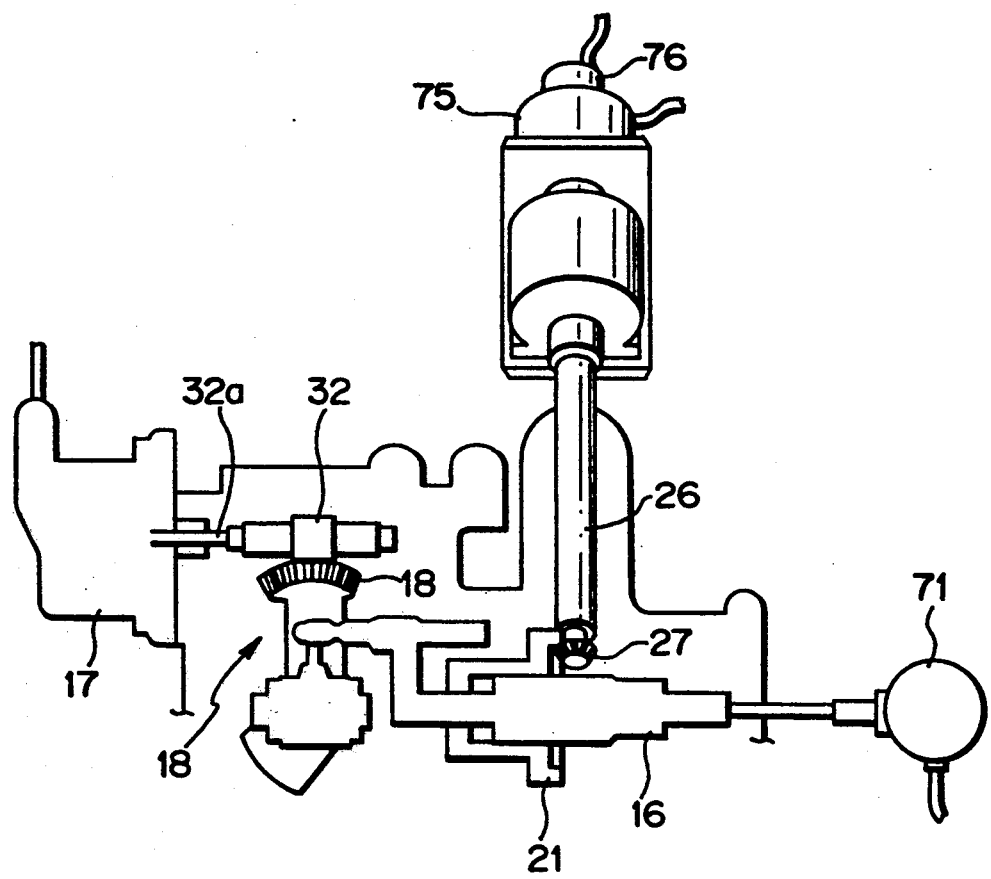
FIG. 11 is a view showing a gauge for measuring a rotational angle of an input shaft and an output rod member in the second embodiment.

Therefore, as shown in FIG. 11, a stepping motor 75, and an encoder 76 for detecting a rotational angle of the stepping motor 75 are attached to the input shaft 26, so that the rotational angle of the input shaft 26 can be measured. In addition, a displacement gauge 71 is attached to the end portion of the output rod assembly 16, so that the stroke displacement of the output rod assembly 16 can be measured. In this case, no hydraulic pressure is applied.

The yoke assembly 18 is swung by the stepping motor 17. Then, the input shaft 26 is pivoted over the entire pivoting range while the yoke assembly 18 is fixed at a specific swing angular position (e.g., a maximum in-phase angular position), and the stroke displacement of the output rod assembly 16 is detected correspondingly. Note that the swing angular position of the yoke assembly 18 can be detected based on a signal from an encoder (not shown) connected to the stepping motor 17.

Thereafter, the rate of change in stroke displacement of the output rod assembly 16 with respect to the rotational angle of the input shaft 26 is obtained, and an angular position where the rate of change becomes maximum is detected as a neutral angular position. The neutral angular position can be detected as follows. For example, an X-Y recorder is connected to the encoder 76 and the displacement gauge 71, and the sine curve $L_1$ (FIG. 10) is drawn while the rotational angle of the input shaft 26 is plotted along the X axis, and the displacement of the output rod assembly 16 is plotted along the Y axis. Alternatively, a microcomputer may be connected to the encoder 76 and the displacement gauge 71, and the rate of change may be directly calculated by the microcomputer.

When the second embodiment is practiced in this manner, the input shaft 26 is pivoted to the detected neutral angular position, thereby attaining the neutral position adjustment of the input shaft 26.

In the detection method of the second embodiment, as described in detail above, the yoke assembly 18 is fixed at a swing angular position corresponding to the maximum in-phase angular position, and the neutral angular position of the input shaft 26 is detected and set with reference to a position near the maximum in-phase position which is apt to pose a serious problem in terms of safety. However, the second embodiment is not limited to such procedures. For example, other in-phase positions may be used as reference positions, or a neutral angular position may be detected with reference to an arbitrary opposite phase position, as needed.

The third embodiment, as another embodiment for detecting the neutral angular position of the input shaft 26, will be described below.

Even if the yoke assembly 18 is set at an angular position corresponding to the in-phase side or an angular position corresponding to the opposite phase side, the input shaft 26 can always pass the neutral angular position as long as it is pivoted over the entire pivoting range. Based on this fact, the yoke assembly 18 is fixed at a swing angular position corresponding to a specific in-phase position, and thereafter, is fixed at another swing angular position corresponding to an opposite phase position. At each position, the input shaft 26 is pivoted over the entire pivoting range. Like in the second embodiment, the relationship between the rotational angle of the input shaft 26 and the stroke displacement of the output rod assembly 16 is expressed as graphs corresponding to the two positions. An intersection between the two graphs can be detected and set as the neutral angular position of the input shaft.

More specifically, the yoke assembly 18 is fed to an arbitrary swing angular position on the in-phase side (or to an arbitrary swing angular position on the opposite phase side) by the stepping motor 17.

Thereafter, the yoke assembly 18 is fixed in position in this state, and the input shaft 26 is pivoted over the entire pivoting range, thereby stroke-displacing the output rod assembly 16. At this time, the relationship (a sine curve $L_1$ in FIG. 12) between the rotational angle of the input shaft 26 and the stroke displacement of the output rod assembly 16 is detected.

Contrary to the above-mentioned operations, the yoke assembly 18 is fed to an arbitrary swing angular position on the opposite phase side (or an arbitrary swing angular position on the in-phase side) by the stepping motor 17. Thereafter, the input shaft 26 is pivoted over the entire pivoting range, thereby stroke-displacing the output rod assembly 16. At this time, the relationship (a sine curve $L_2$ in FIG. 12) between the rotational angle of the input shaft 26 and the stroke displacement of the output rod assembly 16 is measured in the same manner as in the above-mentioned operations.

The two relationships between the stroke displacement of the output rod assembly 16 and the rotational angle of the input shaft 26 are drawn to overlap each other (FIG. 12), thereby obtaining a point where the curves always pass regardless of the in-phase or opposite phase side (neutral angular position), i.e., an intersection.

Thereafter, the yoke assembly 18 is rotated to move the output rod assembly 16 to the intersection (the center of the displacement of the output rod assembly 16). The rotational angle (pulse count) of the stepping motor 17 in this state is stored.

In order to detect and set the neutral angular position with reference to a high-velocity mode requiring precision, the yoke assembly 18 is moved to the swing angular position corresponding to the maximum in-phase position, and the input shaft 26 is rotated until the stroke position of the output rod assembly 16 reaches the intersection. The rotational angle of the input shaft 26 in this state is stored as the neutral angular position.

When the input shaft 26 is pivoted to the neutral angular position detected upon practice of the third embodiment as described above, the neutral position adjustment of the input shaft 26 can be attained.

In the reference position detection method of the third embodiment, in order to improve detection precision of the neutral position of the input shaft 26, the yoke assembly 18 is fixed at a swing angular position corresponding to the in-phase side, and is fixed at another swing angular position corresponding to the opposite phase side, thereby detecting the neutral position of the input shaft. However, the present invention is not limited to this. For example, the yoke assembly may be fixed at two swing angular positions corresponding to the in-phase side, and may be fixed at two angular positions corresponding to the opposite phase side, thereby similarly detecting the neutral angular position of the input shaft 26.

As described above, according to the reference position detection methods of the second and third embodiments, the neutral angular position (zero phase) of the input shaft 26 can be precisely detected.

In particular, the neutral angular position of the input shaft 26 can be detected with reference to a specific phase position (e.g., a maximum in-phase position), or the neutral angular position can be detected with reference to two phases. Therefore, an offset between neutral angular positions in different phases can be minimized.

In each of the first to third embodiments described above, the detection method of the neutral position of the yoke assembly 18 or the input shaft 26 has been described. In the fourth embodiment to be described below, a reference position detection method of the mechanical system in the rear wheel steering apparatus 1 will be described below with reference to FIGS. 13 to 16.

More specifically, in the fourth embodiment, a method of detecting a neutral position as a reference position of the mechanical system in the rear wheel steering apparatus 1, i.e., a method of detecting neutral positions of the input shaft 26 and the yoke assembly 18, will be described below. The neutral position detection method in the fourth embodiment is practiced in a state wherein the support 38 is temporarily assembled, no cover 53 is attached to the casing 25, and no hydraulic pressure is applied.

In the fourth embodiment, in order to more precisely perform neutral adjustment, a temporary neutral position of one of the input shaft 26 and the yoke assembly 18 is detected. The one component is fixed at the temporary neutral position, and the other component is driven in this state. The neutral position of the one component is corrected on the basis of a displacement state of the output rod assembly 16 at this time. Thereafter, the neutral position of the other component is corrected by the same method.

A detailed measurement system for this adjustment is the same as the arrangement shown in FIG. 11, and a detailed description thereof will be omitted here.

Figure 13:
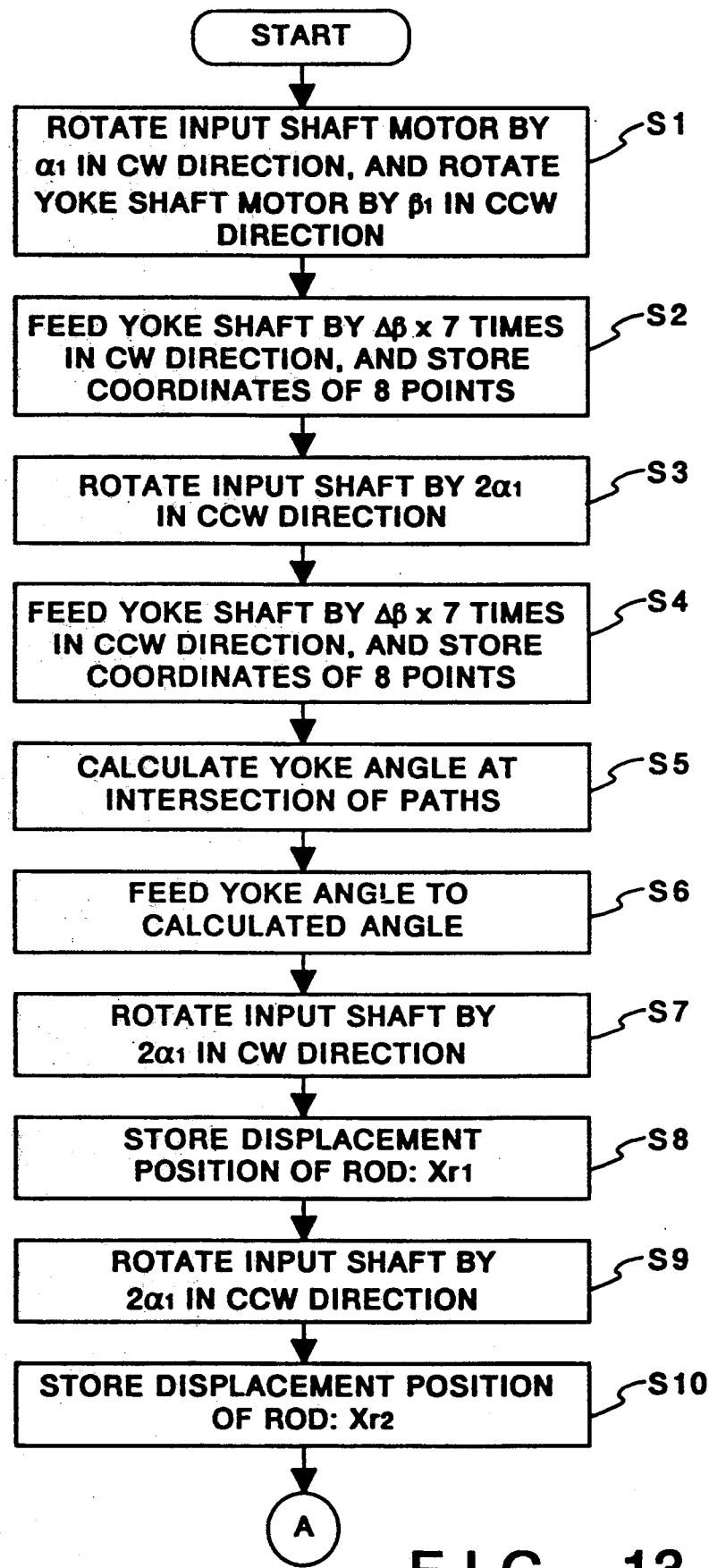
FIG. 13(A) is a flow chart for explaining a method of detecting and adjusting a neutral angular position of a yoke assembly in the fourth embodiment of the reference position detection method according to the present invention.
FIG. 13(B) is a continuation of the flow chart in FIG. 13(A)
Figure 13:
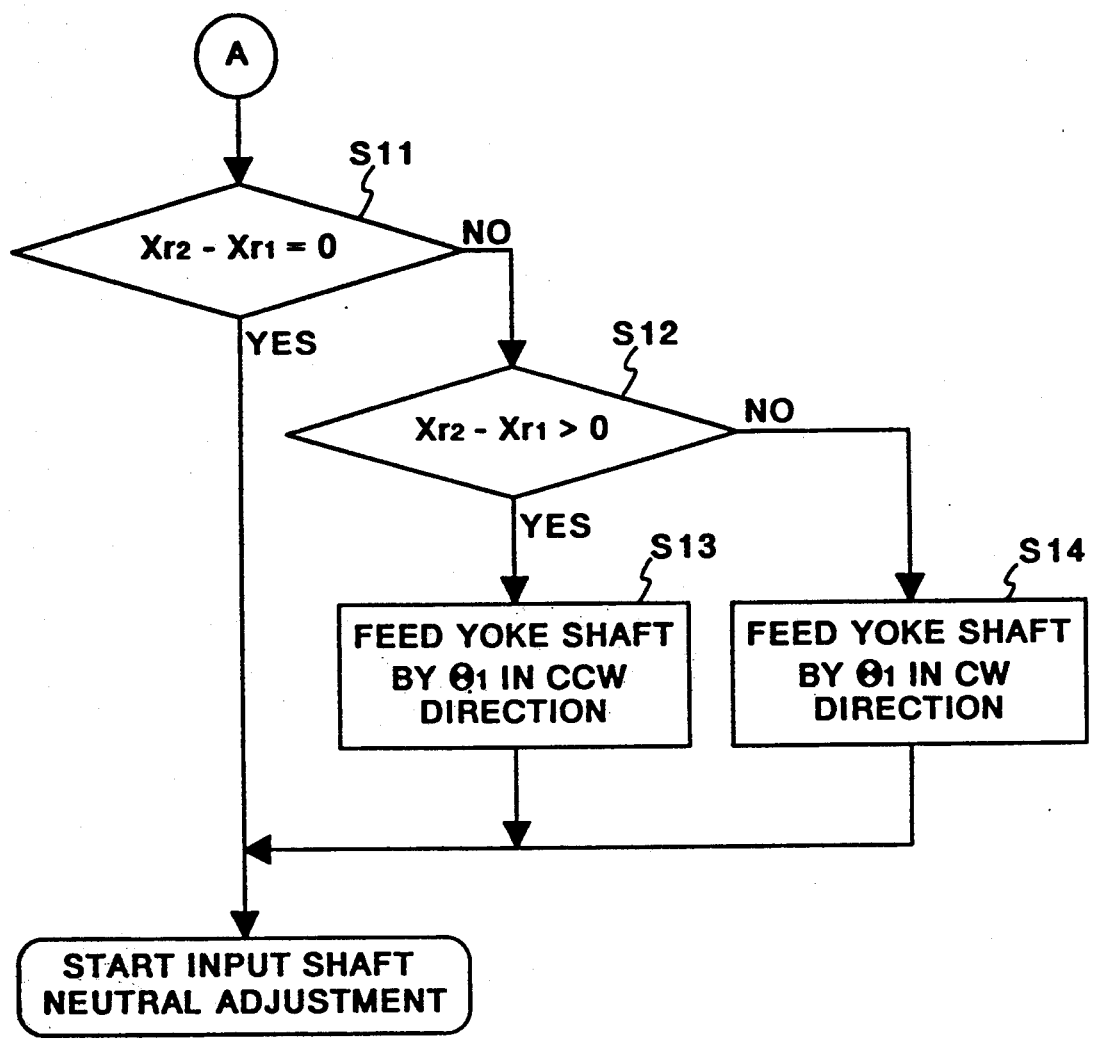
Figure 15:
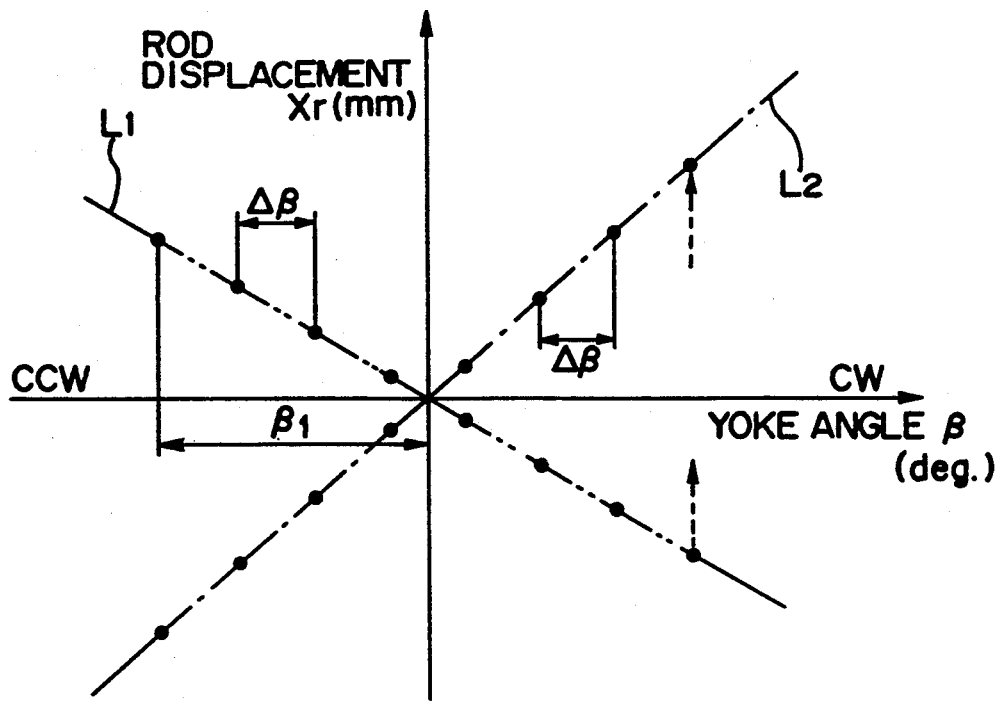
FIG. 15 is a graph showing the relationship between a yoke angle and a displacement of an output rod member in the fourth embodiment.
Figure 16:
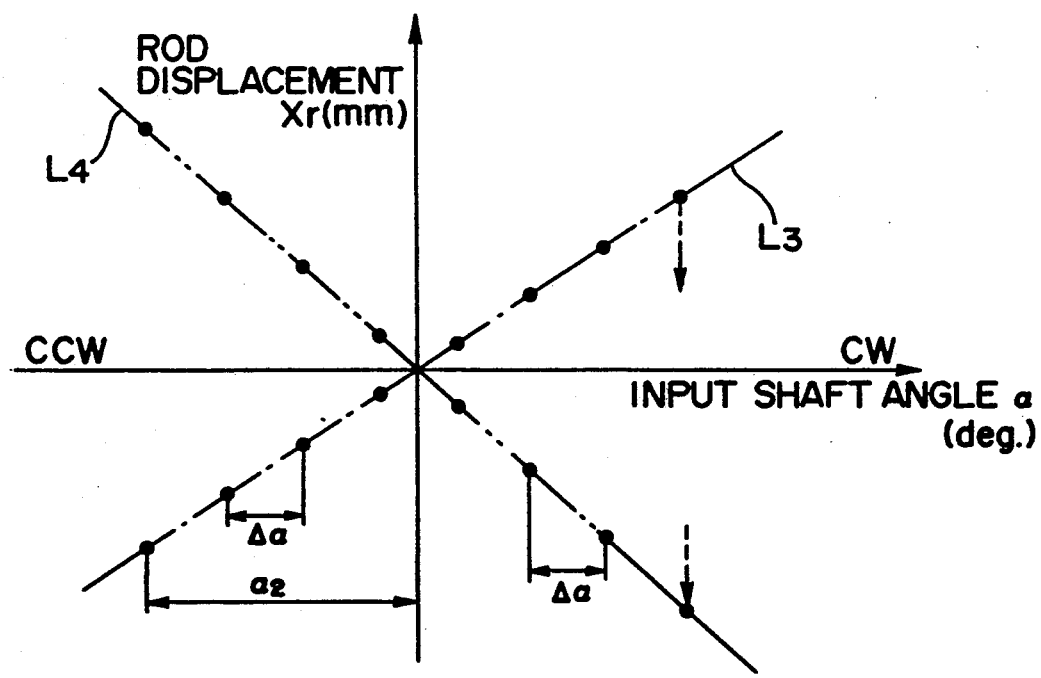
FIG. 16 is a graph showing the relationship between an input angle and the displacement of the output rod member in the fourth embodiment.

The neutral position detection method of the input shaft 26 and the yoke assembly 18 using the measurement system with the arrangement shown in FIG. 11, and a method of adjusting the input shaft 26 and the yoke shaft 32a to the neutral positions detected by the detection method will be described below with reference to the flow charts shown in FIGS. 13 and 14, and graphs shown in FIGS. 15 and 16.

When the measurement is started, the stepping motor (input shaft motor) 75 for driving the input shaft 26 is rotated by an angle $\alpha_1$ [deg.] in the clockwise direction (CW direction), and the stepping motor (yoke shaft motor) 17 for driving the yoke shaft 32a is rotated by an angle $\beta_1$ [deg.] in the counterclockwise direction (CCW direction) in step S1.

In step S2, the yoke shaft motor 17 is driven to feed the yoke shaft 32a by an angle $\Delta\beta$ seven times in the CW direction, and the coordinates of a total of eight points (including the start point) of the displacement of the rod with respect to the yoke angle are stored. A line $L_1$ indicated by an alternate long and two short dashed line in the graph of FIG. 15 can be obtained on the basis of a path obtained by connecting the coordinates of the eight points.

Thereafter, in step S3, the input shaft 26 is rotated by an angle $2\alpha_1$ [deg.] in the CCW direction. In step S4, the yoke shaft 32a is fed by an angle $\Delta\beta$ seven times in the CCW direction, and the coordinates of a total of eight points (including the start point) of the displacement of the rod with respect to the yoke angle are stored. A line $L_2$ indicated by an alternate long and short dashed line in the graph of FIG. 15 can be obtained on the basis of a path obtained by connecting the coordinates of the eight points.

In step S5, a yoke angle at the intersection of the lines $L_1$ and $L_2$ obtained at the two different input angles is calculated. Thereafter, in step S6, the yoke shaft 32a is fed to a position corresponding to the calculated angle. This angle is determined as a temporary neutral position of the yoke shaft 32a, and the yoke shaft 32a is fixed at this temporary neutral position.

In step S7, the input shaft 26 is rotated by, e.g., an angle $2\alpha_1$ [deg.] in the CW direction, and in step S8, a displacement position $Xr_1$ of the rod is stored. Thereafter, in step S9, the input shaft 26 is reversed by an angle $2\alpha_1$ [deg.] in the CCW direction, and in step S10, a displacement position $Xr_2$ of the rod is stored.

It is checked in step S11 if the two displacement positions $Xr_1$ and $Xr_2$ are equal to each other ($Xr_2 - Xr_1 = 0$). If NO in step S11, i.e., if it is determined that the temporary neutral position does not coincide with a true neutral position, which one of the two displacement positions $Xr_1$ and $Xr_2$ is larger is determined in step S12. In this manner, it can be determined to which side the temporary neutral position is offset from the true neutral position.

If $Xr_2$ is larger ($Xr_2-Xr_1>0$), it can be detected that the yoke shaft 32a is offset from the true neutral position by an angle $\Theta_1$ [deg.] (to be described later) in the CW direction. For this reason, in step S13, the yoke shaft 32a is rotated by the angle $\Theta_1$ [deg.] in the CCW direction, thus correcting the neutral position. If $Xr_2$ is smaller, the yoke shaft 32a is rotated by the angle $\Theta_1$ [deg.] in the CW direction, thus correcting the neutral position in step S14.

Note that the angle $\Theta_1$ can be obtained by calculating $\Theta_1 = (Xr_2-Xr_1)/K_1$. The constant $K_1$ in this equation can be easily changed by inputting data.

On the other hand, if YES in step S11, it is detected that the temporary neutral position coincides with the true neutral position. In this manner, the neutral adjustment of the yoke shaft 32a is ended, and then, the neutral adjustment of the input shaft 26 is started.

Figure 14:
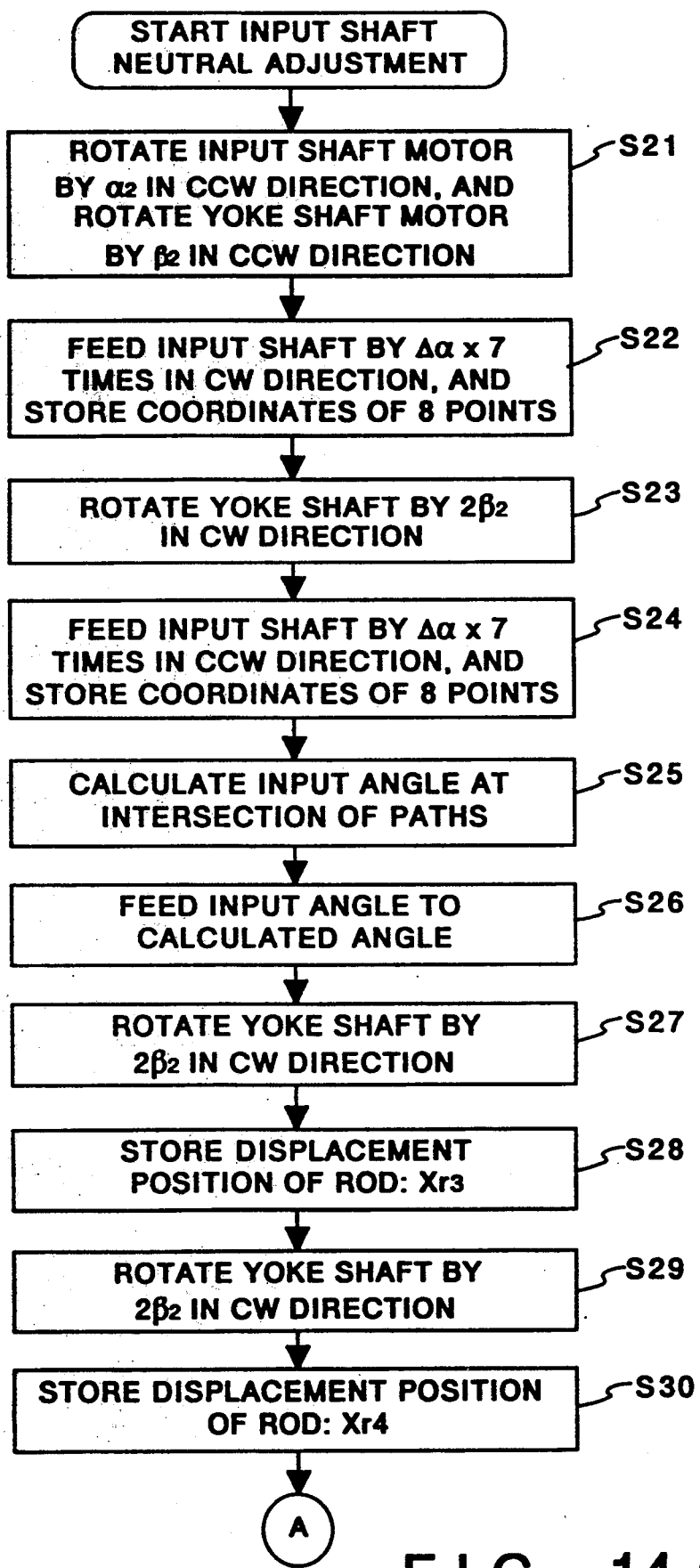
FIG. 14(A) is a flow chart for explaining a method of detecting and adjusting a neutral angular position of an input shaft in the fourth embodiment.
FIG. 14(B) is a continuation of the flow chart in FIG. 14(A)

More specifically, as shown in the flow chart of FIG. 14, the input shaft motor 75 is rotated by an angle $\alpha_2$ [deg.] in the CCW direction, and the yoke shaft motor 17 is rotated by an angle $\beta_2$ [deg.] in the CCW direction in step S21.

In step S22, the input shaft 26 is fed by an angle $\Delta\alpha$ seven times in the CW direction, and the coordinates of a total of eight points (including the start point) of the displacement of the rod with respect to an input angle are stored. A line L4 indicated by an alternate long and two short dashed line in the graph of FIG. 16 can be obtained on the basis of a path obtained by connecting the coordinates of the eight points.

In step S25, an input angle at the intersection between the two lines L3 and L4 obtained at the two different yoke angles is calculated. In step S26, the input shaft 26 is fed to a position corresponding to the calculated value. This angle is determined as a temporary neutral position of the input shaft 26, and the input shaft 26 is fixed at the temporary neutral position.

In step S27, the yoke shaft 32a is rotated by, e.g., an angle $2\beta_2$ [deg.] in the CCW direction, and in step S28, a displacement position $Xr_3$ of the rod is stored. Thereafter, in step S29, the yoke shaft 32a is reversed by the angle $2\beta_2$ [deg.] in the CW direction, and in step S30, a displacement position $Xr_4$ of the rod is stored.

It is checked in step S31 if the two displacement positions $Xr_3$ and $Xr_4$ are equal to each other ($Xr_4-Xr_3=0$). If NO in step S31, which one of the two displacement positions is larger is determined in step S32. If $Xr_4$ is larger ($Xr_4-Xr_3>0$), it can be detected that the input shaft 26 is offset from the true neutral position by an angle $\Theta_2$ [deg.] (to be described later) in the CCW direction. For this reason, in step S33, the input shaft 26 is rotated by the angle $\Theta_2$ [deg.] in the CW direction, thereby correcting the neutral position. If $Xr_4$ is smaller, the input shaft 26 is rotated by the angle $\Theta_2$ [deg.] in the CCW direction, thereby correcting the neutral position in step S34.

Note that the angle $\Theta_2$ can be obtained by calculating $\Theta_2 = (Xr_4-Xr_3)/K_2$. The constant $K_2$ in this equation can be easily changed by inputting data.

On the other hand, if YES in step S31, since it is detected that the temporary neutral position coincides with the true neutral position, the neutral adjustment of the input shaft 26 is ended.

As described above, according to the fourth embodiment, a temporary neutral position of one of the input shaft 26 and the yoke assembly 18 is detected, and the one component is fixed at the detected position. In this state, the other component is driven. Therefore, if the one component is fixed at the true neutral position, the displacement of the output rod assembly 16 becomes minimum (0) when the other component is driven. An offset of the temporary neutral position from the true neutral position can be calculated and corrected on the basis of the displacement state (displacement direction and amount) of the output rod assembly 16. As a result, an error caused by, e.g., the influence of the hysteresis can be eliminated, and high-precision neutral adjustment can be performed.

When the temporary neutral position is detected, the temporary neutral position of the input shaft 26 is detected on the basis of stroke characteristics of the output rod assembly 16 with respect to the rotational angle of the input shaft 26, and the temporary neutral position of the yoke assembly 18 is detected on the basis of stroke characteristics of the output rod assembly 16 with respect to the swing angle of the assembly 18. Therefore, a temporary neutral position closer to the true neutral position can be detected. As a result, a correction amount can be reduced, and neutral adjustment can be performed more precisely.

The method of detecting the temporary neutral position is not limited to the method described in the fourth embodiment, but another method may be adopted. More specifically, for example, as for the input shaft 26, since a position (steepest slope point) where the rate of change in stroke displacement is maximized in the graph of the stroke characteristics of the output rod assembly 16 with respect to the rotational angle of the input shaft 26 corresponds to the neutral position of the input shaft 26 like in the second embodiment, this position may be detected as the temporary neutral position, and the above-mentioned neutral adjustment method may be applied.

As for the yoke assembly 18, the temporary neutral position may be detected in the same manner as in the first embodiment. Furthermore, a correction amount may be increased. In this case, the temporary neutral position may be manually set under the visual observation, and the above-mentioned neutral adjustment method may be applied.

As many apparently widely different embodiments of the present invention can be made without departing from the spirit and scope thereof, it is to be understood that the invention is not limited to the specific embodiments thereof except as defined in the appended claims.

What is claimed is:

1. A reference position detection method of a vehicle rear wheel steering apparatus which includes:
    an input shaft for inputting a steering angle of front wheels;
    an output rod assembly which is stroked in an axial direction thereof upon reception of an input from said input shaft so as to steer the rear wheels; and
    a yoke assembly coupled to and swingably supported by said output rod assembly, and
    wherein a stroke amount of said output rod assembly upon rotation of said input shaft is changed in accordance with a swing angle of said yoke assembly, said method comprising:
    a first step of setting said input shaft and the yoke assembly at arbitrary angular positions;

a second step of rotating said input shaft by an arbitrary angle to pass a neutral angular position in a state set in the first step;

a third step of measuring a rotational angle $\theta$ of said input shaft and a moving amount $\delta 1$ of said output rod assembly upon rotation in the second step;

a fourth step of rotating said yoke assembly to pass a neutral angular position so that said output rod assembly is stroke-moved by a moving amount $-\delta 1$ from a stroke position defined by the moving amount $\delta 1$ of said output rod assembly measured in the third step;

a fifth step of rotating said input shaft by an angle $-\theta$ after the fourth step, and measuring a moving amount $\delta 2$ of said output rod assembly; and a sixth step of determining, as a reference position of said yoke assembly, an angular position obtained by rotating said yoke assembly from the rotated state in the fifth step so that said output rod assembly is displaced by:

$$-\delta s^2/(\delta 1+\delta 2)$$

2. The method according to claim 1, wherein the reference position detected in the sixth step is defined as a neutral angular position of said yoke assembly.

3. The method according to claim 1, wherein the first to sixth steps are executed in a state wherein no hydraulic pressure is applied to a hydraulic system.

4. The method according to claim 1, wherein the first step comprises the first substep of fixing said input shaft at an angular position other than a neutral angular position, and the second substep of fixing said yoke assembly at an angular position other than a neutral angular position.

5. A reference position detection method of a vehicle rear wheel steering apparatus which includes:

an input shaft for inputting a steering angle of front wheels;

an output rod assembly which is stroked in an axial direction thereof upon reception of an input from said input shaft so as to steer the rear wheels; and a yoke assembly, coupled to and swingably supported by said output rod assembly, for changing a stroke displacement of said output rod assembly upon rotation of said input shaft in accordance with a swing angle thereof, said method comprising:

a first step of setting said yoke assembly at a swing angular position as a reference position;

a second step of detecting a stroke displacement of said output rod assembly while rotating said input shaft in a state set in the first step;

a third step of calculating a rate of change in stroke displacement of said output rod assembly with respect to a rotational angle of said input shaft; and a fourth step of determining, as a reference position of said input shaft, an angular position where the rate of change calculated in the third step becomes a maximum value.

6. The method according to claim 5, wherein the reference position detected in the fourth step is defined as a neutral angular position of said input shaft.

7. The method according to claim 5, wherein the first to fourth steps are executed in a state wherein no hydraulic pressure is applied to a hydraulic system.

8. A reference position detection method of a vehicle rear wheel steering apparatus which includes:

an input shaft for inputting a steering angle of front wheels;

an output rod assembly which is stroked in an axial direction thereof upon reception of an input from said input shaft so as to steer the rear wheels; and a yoke assembly, coupled to and swingably supported by said output rod assembly, for changing a stroke displacement of said output rod assembly upon rotation of said input shaft in accordance with a swing angle thereof, said method comprising:

a first step of setting said yoke assembly at a first swing angular position;

a second step of detecting a first stroke displacement of said output rod assembly while rotating said input shaft;

a third step of setting said yoke assembly at a second swing angular position different from the first swing angular position;

a fourth step of detecting a second stroke displacement of said output rod assembly while rotating said input shaft; and a fifth step of determining, as a reference position of said input shaft, a position where the displacements of said output rod assembly with respect to a rotational angle of said input shaft at the first and second swing angular positions of said yoke assembly coincide with each other.

9. The method according to claim 8, wherein the reference position detected in the fifth step is defined as a neutral angular position of said input shaft.

10. The method according to claim 8, wherein the first to fifth steps are executed in a state wherein no hydraulic pressure is applied to a hydraulic system.

11. A reference position detection method of a vehicle rear wheel steering apparatus which includes a mechanical system for displacing a rear wheel steering shaft for steering rear wheels, and a hydraulic system for assisting the displacement of said rear wheel steering shaft, said mechanical system including:

an input shaft for inputting a steering angle of front wheels;

an output rod assembly which is stroked in an axial direction thereof upon reception of an input from said input shaft;

a yoke assembly, coupled to and swingably supported by said output rod assembly, for controlling a stroke amount of said output rod assembly upon rotation of said input shaft in accordance with a swing angle thereof; and displacement transmission means, coupled to said output rod assembly, for transmitting the stroke amount of said output rod assembly to said rear wheel steering shaft, and said hydraulic system including:

power steering means for hydraulically assisting the displacement of said rear wheel steering shaft;

a hydraulic control valve for controlling said power steering means; and connection means for coupling said hydraulic control valve to said displacement transmission means to connect said mechanical and hydraulic systems, said method comprising:

a first step of detecting a temporary reference position of one of said input shaft and said yoke assembly;

a second step of fixing said one of said input shaft and said yoke assembly at the detected temporary reference position;

a third step of driving the other one of said input shaft and said yoke assembly;

a fourth step of detecting a displacement state of said output rod assembly in a driving state in the third step; and a fifth step of detecting a reference position of said one of said input shaft and said yoke assembly on the basis of a detection result in the fourth step.

12. The method according to claim 11, wherein
the first step includes the step of detecting the temporary reference position of said input shaft on the basis of stroke characteristics of said output rod assembly with respect to a rotational angle of said input shaft.

13. The method according to claim 11, wherein
the first step includes the step of detecting the temporary reference position of said yoke assembly on the basis of stroke characteristics of said output rod assembly with respect to a swing angle of said yoke assembly.

14. The method according to claim 11, wherein
the first to fifth steps are executed in a state wherein no hydraulic pressure is applied to said hydraulic system.

15. The method according to claim 11, wherein
the reference position detected in the fifth step is defined as a neutral position of one of said input shaft and said yoke assembly.

16. The method according to claim 15, wherein
the first step includes the step of detecting the temporary reference position of said yoke assembly;

the second step includes the step of fixing said yoke assembly at the detected temporary reference position;

the third step includes the step of driving said input shaft;

the fourth step includes the step of detecting the displacement state of said output rod assembly in a driving state of said input shaft in the third step; and the fifth step includes the step of detecting the reference position of said yoke assembly on the basis of the detection result in the fourth step.

17. The method according to claim 15, wherein
the first step includes the step of detecting the temporary reference position of said input shaft;

the second step includes the step of fixing said input shaft at the detected temporary reference position;

the third step includes the step of driving said yoke assembly;

the fourth step includes the step of detecting the displacement state of said output rod assembly in a driving state of said yoke assembly in the third step; and the fifth step includes the step of detecting the reference position of said input shaft on the basis of the detection result in the fourth step.

* * * * *